(12) United States Patent
Penther

(10) Patent No.: US 6,756,872 B2
(45) Date of Patent: Jun. 29, 2004

(54) RESOURCE-CONSTRAINED TURBO-EQUALIZATION

(75) Inventor: Bertrand Penther, Rennes (FR)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 41 days.

(21) Appl. No.: 09/912,542

(22) Filed: Jul. 26, 2001

(65) Prior Publication Data

US 2002/0037034 A1 Mar. 28, 2002

(30) Foreign Application Priority Data

Aug. 11, 2000 (EP) .......................................... 00 402272

(51) Int. Cl.[7] .............................................. H03H 7/30
(52) U.S. Cl. ...................................... 335/229; 375/341
(58) Field of Search ................................ 375/229, 262, 375/265, 341; 714/758, 776, 792, 794

(56) References Cited

U.S. PATENT DOCUMENTS 6,182,261 B1 * 1/2001 Haller et al. ................ 714/758

FOREIGN PATENT DOCUMENTS

| EP | 0 794 631 | 9/1997 |
|---|---|---|
| EP | 0 998 087 | 5/2000 |
| WO | WO 00 27037 | 5/2000 |

OTHER PUBLICATIONS

C. H. Wong, et al., "Wideband Burst–by–Burst Adaptive Modulation with Turbo Equalization and Iterative Channel Estimation", 2000 IEEE 51st Vehicular Technology Conference Proceedings, vol. 3, May 15–18, 2000, pp. 2044–2048.

Michael Tuechler, et al., "Iterative Correction of ISI VIA Equalization and Decoding with Priors", 2000 IEEE International Symposium on Information Theory, Jun. 25–30, 2000, p. 100.

Krishna Balachandran, et al., "Channel Quality Estimation and Rate Adaptation for Cellular Mobile Radio", IEEE Journal on Selected Areas in Communications, vol. 17, No. 7, Jul. 1999, pp. 1244–1256.

I. Fijalkow, et al., "Improved Interference Cancellation for Turbo–Equalization", 2000 IEEE International Conference on Acoustics, Speech, and Signal Processing, vol. 1, Jun. 5–9, 2000, pp. 416–419.

* cited by examiner

Primary Examiner—Don N. Vo
(74) Attorney, Agent, or Firm—Oblon, Spivak, McClelland, Maier & Neustadt, P.C.

(57) ABSTRACT

The invention concerns a method for equalizing symbols received from a transmission channel and for decoding data therefrom, the method comprising a sequence of processing steps $E_i$ using an available resource R, each processing step $E_i$ involving a resource cost $R_i(T_{ij})$ depending upon parameters $T_{ij}$ relative to an algorithm carried out by said processing step $E_i$, at least a subset of the parameters $T_{ij}$ being controlled so as to maximise a criterion of performance under the constraint:

$$\sum_i R_i(T_{ij}) \leq R.$$

23 Claims, 3 Drawing Sheets

RESOURCE-CONSTRAINED TURBO-EQUALIZATION

BACKGROUND OF THE INVENTION

1. Field of the Invention

The present invention concerns a method for equalizing symbols received from a transmission channel and decoding data therefrom. The invention more specifically concerns an equalization method which is implemented in a digital signal processor (DSP).

2. Description of the Related Art

Equalization is a well known method for removing Inter Symbol Interference (ISI) affecting a transmission channel.

The signal samples at the channel output can be expressed as:

$$R_k = \sum_{i=0}^{L-1} c_i D_{k-i} + \eta_k \quad (1)$$

where $c_i$ are the channel coefficients defining the impulse response of the transmission channel (CIR), L is the delay spread of the channel, $D_{k-i}$ is a M-ary modulated symbol and $\eta_k$ is the sampled additive white Gaussian (AWG) noise affecting the channel. From equation (1) the transmission channel can be viewed as a finite impulse response filter with L taps.

A first class of equalization methods is concerned with symbol-by-symbol equalization. A simple equalization method consists in using a transverse linear filter for cancelling the ISI symbol by symbol. Of course, the tap coefficients of the transversal filter can be adapted to track the variations of the channel characteristics. However linear equalization performs poorly due to the effect of noise enhancement. This effect is mitigated in nonlinear Decision Feedback Equalization (DFE). A decision feedback equalizer comprises two parts: a feedforward part identical to a transverse linear filter and a feedback part including a decision step on the received symbol. The feedback part estimates the ISI contributed by the previously decided symbols and subtracts this estimation from the transverse linear filter output before the decision on the current symbol is made.

A second class of equalization methods derives from a Maximum Likelihood Sequence approach called therefore Maximum Likelihood Sequence Estimation (NILSE). According to this approach, the discrete memory channel is modelled as a finite-state machine, the internal register of which having the length of the channel memory. The most likely transmitted sequence $D_k$, knowing the received sequence $R_k$ and the channel coefficients, is obtained by the Viterbi algorithm. Since the number of states of the trellis involved in the Viterbi algorithm grows exponentially with the channel memory length, several proposals have been made to reduce the number of states to be taken into account. In a first attempt to mitigate this effect, DDFSE (Delayed Decision Feedback Sequence Estimation) combines MLSE and DYE techniques by truncating the channel memory to a reduced number of terms and by removing in the branch metrics the tail of the ISI using a decision made on the surviving sequence at an earlier step (tentative decision). A further improvement with respect to error propagation, called RSSE, (Reduced State Sequence Estimation) was inspired by an Ungerboeck-like set partitioning principle.

The RSSE algorithm was originally disclosed in the article of V. M. Eyuboglu et al. entitled "Reduce-state sequence estimation with set partitioning and decision feedback", published in IEEE Trans. Commun., Vol. 36, pages 13–20, January 1988. Broadly speaking, in RSSE the symbols are partitioned into subsets and Viterbi decoding is performed on a subset-trellis, a node or subset-state of the subset-trellis being a vector of subset labels instead of a vector of symbols like in DDFSE. An advantage of RSSE over DDFSE is that it does not use tentative decisions but embeds the uncertainty of the channel response within the trellis structure.

Another possible way of relaxing the constraints in the decoding trellis is the list-type generalization of the Viterbi algorithm (GVA) proposed by T. Hashimoto in the article entitled "A list-type reduced-constraint generalization of the Viterbi algorithm" published in IEEE Trans. Inform. Theory, vol. IT-33, N°6, Nov. 1987, pages 866–876. The Viterbi algorithm is generalized in that, for a given state in the trellis diagram, a predetermined. number S of paths (survivors) leading to that state, (instead of a single one in the conventional Viterbi algorithm) are retained for the next step. The retained paths are then extended by one branch corresponding to the assumed received symbol and the extended paths are submitted to a selection procedure leaving again S survivors per state. The GVA was applied to equalisation by Hashimoto himself in the above mentioned paper and a list-type Viterbi equalizer and later developed by Kubo et al. the article entitled "A List-output Viterbi equalizer with two kinds of metric criteria" published in Proc. IEEE International Conference on Universal Personnal Comm. '98, pages 1209–1213.

Both RSSE and LOVE (List Output Viterbi Equalization) can be regarded as particular cases of Per Survivor Processing (PSP) described in the article of R. Raheli et al. entitled "Per Survivor Processing" and published in Digital Signal Processing, N°3, July 1993, pages 175–187. PSP generally allows joint channel estimation and equalization by incorporating in the Viterbi algorithm a data aided estimation of the channel coefficients. This technique is particularly useful in mobile telecommunication for equalization of fast fading channels.

Recently, a new method of equalisation has been derived from the seminal principle of turbo-decoding discovered by C. Berrou, A. Glavieux, P. Thitimajshima, and set out in the article entitled "Near Shannon limit error-correcting coding and decoding: Turbo-coding", ICC '93, Vol. 2/3, May 1993, pages 1064–1071. This principle has been successfully applied to equalization by C. Douillard et al. as described in the article entitled "Iterative correction of Intersymbol Interference: Turbo-equalization" published in European Trans. Telecomm., Vol. 6, N°5, Sept./Oct. 95, pages 507–511.

The basic principle underlying turbo-equalization is that an ISI channel can be regarded as a convolutional coder and therefore the concatenation of a coder, an interleaver and the transmission channel itself can be considered as a turbo-coder.

Turbo-equalization is based on an iterative joint equalization and channel decoding process. FIG. 1 shows an example of a transmission system using turbo-equalization. The transmitter comprises a systematic coder (100), e.g. a systematic convolutional coder (K,R) where K is constraint length and R is the binary rate, which encodes the input data $I_k$ into error-control coded data $Y_n$, an interleaver (110) outputting interleaved data $Y_{n'}$, and a M-ary modulator (120), e.g. a BPSK modulator or a QAM modulator. At the receiver side, the turbo-equalizer TE is represented with dotted lines. The symbols $R_{n'}$ affected by ISI are supplied to a soft equalizer (140) which outputs soft values $A_{n'}$, representing the reliability of the estimation of $Y_{n'}$. The soft equalization may be implemented by a Soft Output Viterbi Algorithm (SOYA) as described in the article of J. Hagenauer and P. Hoeher entitled "A Viterbi algorithm with soft-decision outputs and its applications" published in Proc. IEEE Globecom '89, pages 47.1.1–47.1.7. Alternately the Maximum A Posteriori (MAP) algorithm initially described in the article of L. Bahl, J. Cocke, F. Jelinek and J. Raviv published in IEEE on Information Theory, vol. IT-20, March 1974, pages 284–287 or a variant thereof (e.g. Log MAP, Max Log MAP) can be used. The latter algorithms will be generically referred to in the following as APP-type algorithms since they all provide the a posteriori probability for each bit to be decided. For example, the soft-equalizer of FIG. 1 implements the Log MAP algorithm which conveniently expresses the reliability information in the form of a Log Likelihood ratio $\Lambda_{n'} = \Lambda(Y_{n'})$. The soft values An are then de-interleaved by the de-interleaver (150) and supplied to a soft-output decoder which may be again a SOYA decoder or an APP-type decoder. The soft decoder uses these soft values and the knowledge of the coding algorithm to form soft estimates $\Lambda_k = \Lambda(I_k)$ of the initial data $I_k$ which in turn permit to refine the estimation of the received symbols. For that, the latter estimates are passed back to the equalization stage. More precisely, the extrinsic information $Ext_k$ produced by the decoding stage, i.e. the contribution of that stage to the reliability of the estimation, is obtained by subtracting in (191) the soft-output from the soft-input of the decoder. The extrinsic information $Ext_k$ is then interleaved in interleaver (180) and fed back as a priori information to the soft equalizer (140). The extrinsic information derived from a stage must not be included in the soft input of the same stage. Hence, the extrinsic information $Ext_k$ is subtracted in (191) from the output of the soft equalizer. The iteration process repeats until the estimation converges or until a time limit is reached. The soft output of the decoder is then compared to a threshold (170) to provide a hard output, i.e. a decision $I_k$ on the bit value.

The reduced state technique has been successfully transposed to the MAP algorithm with the view of applying it to turbo-equalization. In particular, a List-type MAP equalizer has been described in unpublished French patent applications FR-A 0000207 and FR-A-0002066 filed by the Applicant on 4.1.2000 and 15.2.2000 respectively and included herein by reference.

The idea of joint channel estimation and equalization has also pervaded turbo-equalization. L. Davis, I. Collings and P. Hoeher have proposed in an article entitled "Joint MAP equalization and channel estimation for frequency-selective fast fading channels" published in Proc. IEEE Globecom '98, pages 53–58 a turboequalizer comprising a MAP equalizer making use of an expanded state trellis. The expansion of the state trellis beyond the channel memory length introduces additional degrees of freedom which are used for estimating the channel parameters. This method is more particularly useful for channels exhibiting fast varying characteristics for example in case of a transmission channel with a high velocity mobile terminal.

Another possible structure of turboequalizer is described in the article of A. Glavieux et al. entitled "Turbo-equalization over a frequency selective channel", International Symposium on Turbo-codes", Brest, Sept. 97. In place of the MAP equalizer illustrated in FIG. 1, the first stage of the turboequalizer comprises a transversal linear filter for cancelling ISI from the received symbols in a decision directed mode followed by a M-ary to binary soft decoder.

Although the overall equalization process may be carried out by a plurality of dedicated processing units, a single digital signal processor (DSP) is preferred in practice. In such instance, the DSP carries out the various steps of equalization per se, deinterleaving, channel and, possibly, source decoding. However, since the processing capacity of the DSP is limited, the processing time may exceed the maximum delay normally accepted for a telephone transmission. Of course, the choice of a DSP of higher capacity entails additional costs.

A subsidiary problem arises when the propagation conditions over the transmission channel vary. It is known from the state of the art to adapt the parameters of the equalizer (e.g. adaptive filter with variable number of taps) or to modify the decoder (in concert with the encoder) e.g. by changing the puncturing rate in a channel encoder/decoder or changing the compression algorithm in a source encoder/decoder. This change may cause a temporary overrun of the processing capacity of the DSP. On the other hand, the choice of an oversized DSP which complies with the "worst-case" requirements is economically expensive and technically unsatisfactory.

BRIEF SUMMARY OF THE INVENTION

The object of the present invention is to propose a method (and a corresponding device) for equalizing symbols received from a transmission channel and decoding data therefrom which solves the above addressed problems.

The method for equalizing symbols received from a transmission channel and for decoding data therefrom includes a sequence of processing steps $E_i$ using an available resource R. Each processing step $E_i$ involves a resource cost $R_i(T_{ij})$ depending upon parameters $T_{ij}$ relative to an algorithm carried out by said processing step $E_i$. The method is characterized in that at least a subset of the parameters $T_{ij}$ is controlled so as to maximize a criterion of performance under the constraint:

$$\sum_i R_i(T_{ij}) \leq R.$$

BRIEF DESCRIPTION OF THE DRAWINGS

The invention will be better understood from a description of the various embodiments of the invention in relation to the following figures.

DETAILED DESCRIPTION OF THE INVENTION

The basic idea underlying the invention is to optimize the overall performance of a DSP-based receiver under a constraint on an available resource. This resource may be, for example a processing time, a number of operations, the size of a memory, the complexity of a circuit, etc. In the following, we assume that the DSP is in charge of equalization, channel decoding and possibly source decoding. Depending on the case, the criterion of performance will be a bit-error rate, a block-error rate, a distortion measure, a quality of service (QoS), a transmission capacity etc.

It is assumed that the various processing steps E; involved in equalization, channel and possibly source decoding are based on algorithms depending upon a set of parameters $T_{ij}$, at least a subset of which are controllable by the DSP. More concretely, some parameters of the system are fixed (e.g. the size of a modulation alphabet) and others (e.g. the number of states of a trellis) can be modified by the DSP. If each step $E_i$ entails a resource cost $R_i(T_{ij})$ where $T_{ij}$ are the above mentioned algorithm parameters, the method according to the invention proposes to maximize the criterion of performance while the resource constraint is met:

$$\sum_i R_i(T_{ij}) \leq R$$

where the R is the available resource. In other words, the different process steps share the common resource R so as to maximize the above mentioned criterion of performance.

Figure 1:
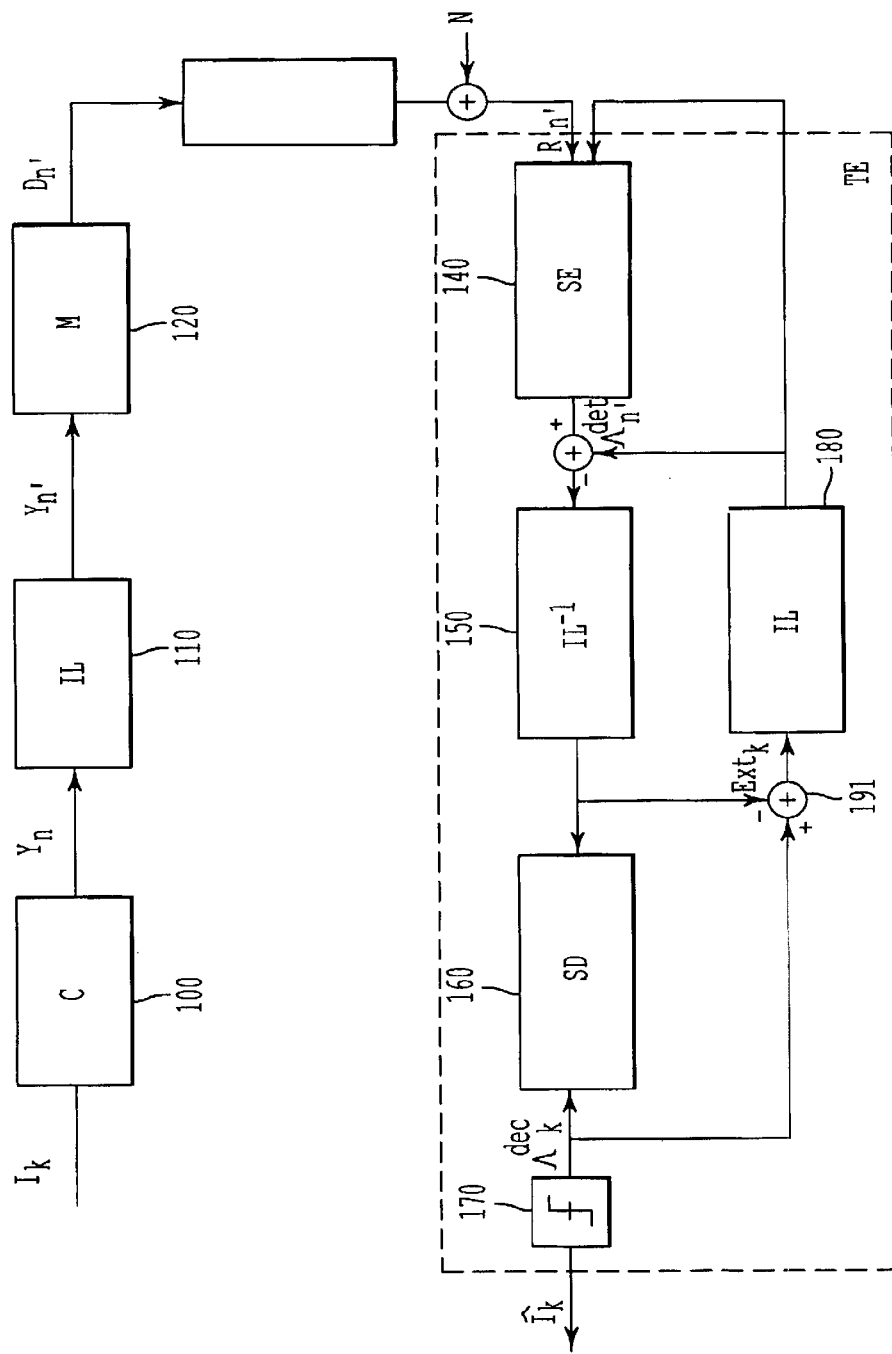
FIG. 1 schematically shows a known transmission system comprising a turbo-equalizer.
Figure 2:
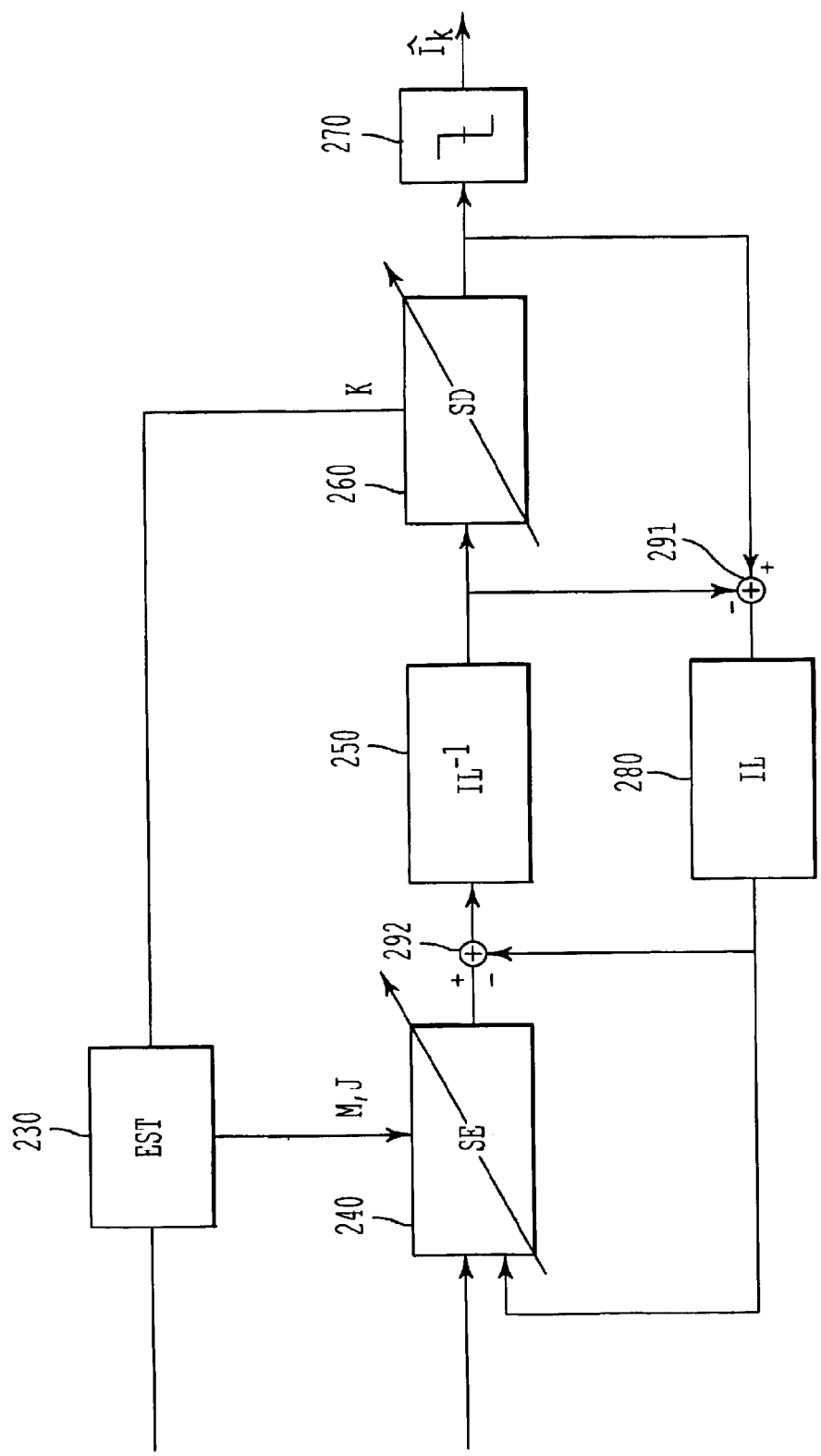
FIG. 2 schematically shows the structure of a receiver according to the invention.

The method according to the invention will be illustrated with an example directed to resource-constrained turbo-equalization, although the invention is obviously not limited thereto. FIG. 2 shows a turbo-equalizer implementing the method according to the invention and described hereafter.

The turbo-equalizer comprises a soft-equalizer (240) of the APP type, preferably a Log MAP equalizer. The number of states in the APP trellis is equal to $M^{L-1}$ where M is size of the modulation alphabet and L is the delay spread of the transmission, i.e. the constraint length of the channel expressed in a number of samples (in other words the size of the channel memory is equal to L−1 samples). For a large memory length however, a second configuration using a reduced state technique is preferred. The number of states taken into account is then reduced to $M^{J-1}$ by truncating the constraint length to a strictly positive integer, J<L (i.e. the channel memory is truncated to J−1). For example, a List-type APP equalizer as disclosed in the above mentioned patent applications may be used in such instance. In contrast, an expanded state trellis may be opted for in case of fast varying characteristics of the transmission channel. The higher number of states in the trellis, $M^{J-1}$ where J>L enables a joint estimation of the channel coefficients and of the data, as explained in the article of L. Davis mentioned above.

In general, the value of J will be set greater or lower than L according to the propagation conditions, e.g. the shape and the variation of the channel impulse response. For example, if the propagation over a mobile transmission channel involves a Line of Sight (LOS) component, in other words if the channel is affected by Ricean dispersion, a reduced state trellis (J<L) could be used. On the other hand, if the transmission channel suffers from fast-fading because the velocity of the mobile terminal is high an expanded state trellis (J>L) could be chosen.

The soft equalizer is followed by a deinterleaver (250) and a soft-decoder (260).

According to a first embodiment, the value of the constraint length K of the code is made variable. The soft decoder (260) (as well as the associated coder at the transmitter side) is adaptive so as to operate with different values of K and hence different trellis sizes. More specifically, the value of K is increased when L (and more generally J) decreases and is decreased when L (or J) increases. It has been discovered indeed that turbo-equalization performs less efficiently when the delay spread of the transmission channel is small. More specifically, for the same number of iterations, the BER gain achieved by the iterative process (also called "turbo-effect") is lower for a small delay spread than for a large delay spread. This can be explained by the fact that the delay spread of transmission channel can be regarded as equivalent to the constraint length of a code and that turbo-equalization is less efficient for small constraint lengths. The invention proposes to compensate for a small delay spread of the transmission channel by increasing the constraint length at the coding stage. According to the invention the choice of K is made so as to meet a resource constraint, for example a complexity constraint. The overall complexity of the turbo-equalizer can be expressed as:

$C_{turbo} = C_{equalizer} + C_{deinterleaver} + C_{decoder}$ where $C_{equalizer}$, $C_{deinterleaver}$, $C_{decoder}$ account for the respective complexities of the equalizer, the deinterleaver and the decoder. The complexity of the deinterleaver is constant i.e. does not depend on K or J. The complexity of the MAP decoder is proportional to the number of states involved in the trellis i.e. can be expressed as '$a \cdot 2^{K-1}$' where 'a' is a fixed coefficient. Similarly, the complexity of the soft-equalizer can be expressed as $b \cdot M^{J-1}$ if it is a MAP equalizer or as $b' \cdot L$, where bb' are fixed coefficients, if it is based on a transversal linear filter with L taps. The complexity constraint can therefore be written as:

$a \cdot 2^{K-1} + b \cdot M^{J-1} < C_{max}$ (2) when soft equalizer (221) is a MAP equalizer and $a \cdot 2^{K-1} + b' \cdot L < C_{max}$ (3) when the soft equalizer (221) is based on a transversal linear filter.

The value of the parameter K is chosen to optimize the BER under the constraint (2) or (3). Preferably, for a given J or L, K is chosen as the highest possible integer meeting the constraint.

When the receiver decides to modify K, it sends a request for incrementing or decrementing K to the transmitter over a reverse channel. This can be done by sending a control bit over a dedicated physical control channel (DPCCH) if the system is a mobile telecommunication system.

According to a second embodiment, the size M of the modulation alphabet is made variable and the constraint length is kept constant. The MAP equalizer (240) (as well as the associated modulator at the transmitter side) is adaptive so as to operate with different values of M and hence different trellis sizes. More specifically, the value of M and, hence, the capacity of the transmission channel is increased when L (and more generally J) decreases and is decreased when L (or J) increases. M is chosen so as meet the constraint (2). The modulation can typically range between 2-QAM or BPSK to 64-QAM. However, since the BER increases with the modulation level, the available received power should be high enough to allow switching to a higher modulation level.

According to a third embodiment, the number N of iterations of the turbo-equalization process is made variable. The BER gain achieved by turbo-equalization increases with the number N of iterations. It may be therefore desirable to increase N while the constraint on the available resource, for example the processing power of the DSP, is still met. In general, the amount of processing power required by turbo-equalization increases linearly versus N (in some instances, however, the DSP may benefit from parallel computation and the increase versus N may be less than linear) and the constraints (2) and (3) have to be replaced by (2') and (3') respectively:

$N \cdot (a \cdot 2^{K-1} + b \cdot M^{J-1}) < C_{max}$ (2')

$N \cdot (a \cdot 2^{K-1} + b' \cdot L) < C_{max}$ (3')

In general, the parameters K7, K,N of the turbo-equalizer are variable and chosen so as to meet a criterion of performance (BER, capacity) under the complexity constraint given by (2) or (3) (or alternately (2'),(3')). More generally, if the system comprises a source decoder after the channel decoder, a further parameter for varying the compression ratio may be taken into account. In any case, the receiver has to send to the transmitter a request for modifying one or a plurality of the parameters M, J, K etc. This could be done by sending a control word whose bits thereof indicate whether to increase or decrease the corresponding parameters.

Figure 3:
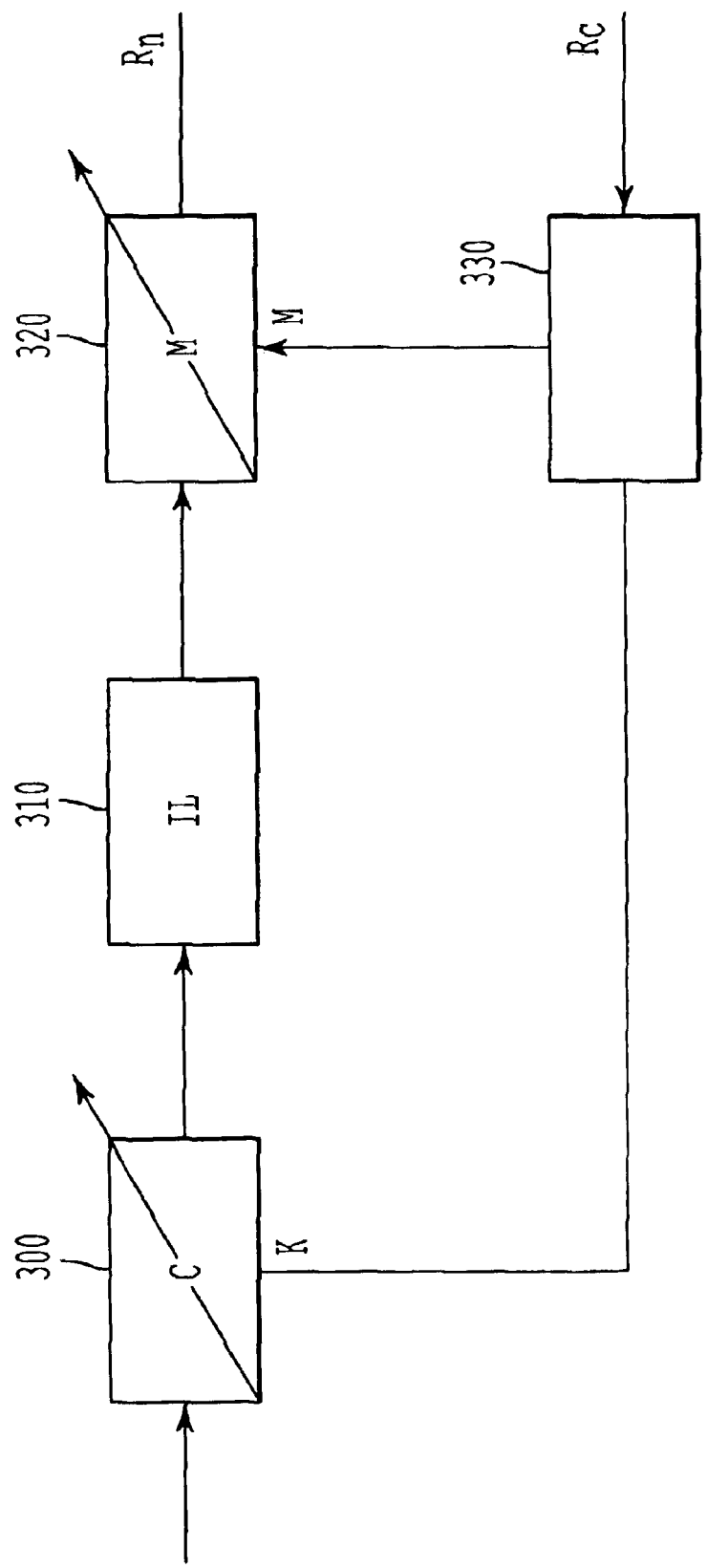
FIG. 3 schematically shows the structure of a transmitter according to the invention.

FIG. 3 schematically shows the structure of a transmitter for use with the receiver of FIG. 2. The transmitter comprises a systematic coder (300) e.g. a systematic convolutional coder whose constraint length is variable, an interleaver (310) and a M-ary modulator (330). Furthermore, the transmitter comprises a controller (330) which receives the requests for incrementing or decrementing the parameters, here M and K from the receiver. The controller updates the different parameters and supplies the updated value K to the coder and the updated value M to the modulator. In addition, the receiver may also include a source coder before the channel coder (300) which similarly could be controlled by the controller (330).

In addition, the controller (330) may control the transmission power of the transmitter. Indeed, a modification of the parameters M,J,K,N may result in a decrease of the BER. Hence, it is possible to lower the signal to noise ratio at the receiving side while keeping an acceptable target BER level. This measure is particularly prescribed for lowering the interference level in a cellular telecommunication system.

What is claimed is:

1. A method for equalizing symbols received from a transmission channel and for decoding data therefrom, the method comprising a sequence of processing steps $E_i$ using an available resource R, each processing step $E_i$ involving a resource cost $R_i(T_{ij})$ depending upon parameters $T_{ij}$ relative to an algorithm carried out by said processing step $E_i$, said method comprising:

controlling at least a subset of the parameters $T_{ij}$ so as to maximise a criterion of performance under the constraint:

$$\sum_i R_i(T_{ij}) \leq R.$$

2. The method of claim 1, further comprising:
dynamically adapting said subset of parameters $T_{ij}$ when a transmission condition varies.

3. The method of claim 1, wherein said processing steps $E_i$ comprise:
equalizing symbols received from a transmission channel via iterative soft equalizing;
de-interleaving the received symbols; and
soft decoding the de-interleaved symbols.

4. The method of claim 3, wherein
said soft equalizing comprises soft equalizing with an APP type algorithm involving a number of states $M^{J-1}$ where M is the alphabet size of the modulation used over the transmission channel, J is a strictly positive integer; and
said soft decoding comprises soft decoding with an APP type algorithm involving a number of states $2^{K-1}$ where K is constraint length of a convolutional code used for coding said data.

5. The method of claim 3, wherein said soft equalizing step comprises:
soft equalizing with a List-type APP algorithm.

6. The method of claim 5, characterized in that J is chosen equal to the delay spread L of the transmission channel and that at least one of K and M is controlled so that $a \cdot 2^{K-1} + b \cdot M^{L-1}$ is lower than a predetermined resource value, where a and b are fixed coefficients.

7. The method of claim 5, characterized in that J is chosen lower or greater than the delay spread L of the transmission channel according to a propagation condition over the transmission channel.

8. The method of claim 7, characterized in that the propagation condition is a Line of Sight or Non Line of Sight condition.

9. The method of claim 7, characterized in that the propagation condition is a fast fading or slow fading condition.

10. The method of claim 7, characterized in that at least K, M or J is adapted so that $a \cdot 2^{K-1} + b \cdot M^{J-1}$), where a and b are fixed coefficients, is lower than a predetermined resource value.

11. The method of claim 7, characterized in that at least one of K,M,J,N is adapted so that $N \cdot (a \cdot 2^{K-1} + b \cdot M^{J-1})$, where a and b are fixed coefficients and N is the number of iterations, is lower than a predetermined resource value.

12. The method of claim 6, characterized in that K is increased when J is decreased and K is decreased when J is increased.

13. The method of claim 6, characterized in that M is increased when J is decreased and M is decreased when J is increased.

14. The method of claim 5, wherein said soft equalizing step comprises:
filtering with a filter having L taps, where L is the delay spread of the transmission channel, so as to cancel intersymbol interference over the transmission channel.

15. The method of claim 14, wherein said soft decoding step comprises:
soft decoding with an APP type algorithm involving a number of states $2^{K-1}$ where K is adapted so that $a \cdot 2^{K-1} + b' \cdot L$, where a and b' are fixed coefficients, is lower than a predetermined resource value.

16. The method of claim 14, wherein said soft decoding step comprises:
soft decoding with an APP type algorithm involving a number of states $2^{K-1}$ where at least one of K and N is adapted so that $N \cdot (a \cdot 2^{K-1} + b' \cdot L)$, where a and b' are fixed coefficients, is lower than a predetermined resource value.

17. The method of claim 15, characterized in that K is increased when L decreases and is decreased when L increases.

18. The method of claim 3, characterized in that the number of iterations is adjusted so that said constraint is met.

19. The method of any of claims 1 to 18, characterized in that the resource R is a time interval.

20. The method of any of the claims 1 to 18, characterized in that the resource R is the size of a memory.

21. The method of any of the claims 1 to 18, characterized in that the resource R is the processing power of a processor.

22. The method of any of the claims 1 to 18, characterized in that a criterion of performance is a function of the error rate.

23. A receiver, comprising:
means for carrying a method according to any of claims 1–18.

* * * * *